United States Patent [19]

Rivkin et al.

[11] 4,381,836
[45] May 3, 1983

[54] ANTI-THEFT POINT-OF-SALE CONTAINER

[75] Inventors: Eric M. Rivkin, Minnetonka; Stanley R. Thorud, Brooklyn Center, both of Minn.

[73] Assignee: Liberty Diversified Industries (Shamrock), Minn.

[21] Appl. No.: 273,667

[22] Filed: Jun. 15, 1981

[51] Int. Cl.³ .......................................... B65D 85/672
[52] U.S. Cl. .............. 206/387; 206/45.14; 206/807
[58] Field of Search ............... 206/1.5, 45.14, 45.31, 206/45.34, 387, 461, 467, 470, 565, 807, 620, 628, 630, 634; 220/22, 72, 23.8, 266, 267

[56] References Cited

U.S. PATENT DOCUMENTS

| 3,587,837 | 6/1971 | Smith | 206/45.14 |
| 3,650,382 | 3/1972 | Braun et al. | 206/45.14 |
| 3,675,763 | 7/1972 | Sandel | 206/45.14 |
| 3,776,374 | 12/1973 | Medendorp | 206/45.14 |
| 3,828,922 | 8/1974 | Holkestad | 206/1.5 |
| 3,871,516 | 3/1975 | Holkestad | 206/45.31 |
| 4,084,865 | 4/1978 | Joyce | 206/387 |
| 4,102,452 | 7/1978 | Sato et al. | 206/387 |
| 4,245,741 | 1/1981 | Holkestad | 206/387 |

FOREIGN PATENT DOCUMENTS 2820829 11/1978 Fed. Rep. of Germany ...... 206/387

*Primary Examiner*—Joseph Man-Fu Moy
*Assistant Examiner*—David Fidei
*Attorney, Agent, or Firm*—Williamson, Bains, Moore & Hansen

[57] ABSTRACT

A container is designed for packaging cassettes or eight-track tapes at the point of sale. The container will hold up to two cassettes or one eight-track and is designed so that once the merchandise has been inserted, the container is closed permanently and must be cut or otherwise destroyed in order to remove the merchandise, such removal to take place by the consumer at home after purchase.

49 Claims, 8 Drawing Figures

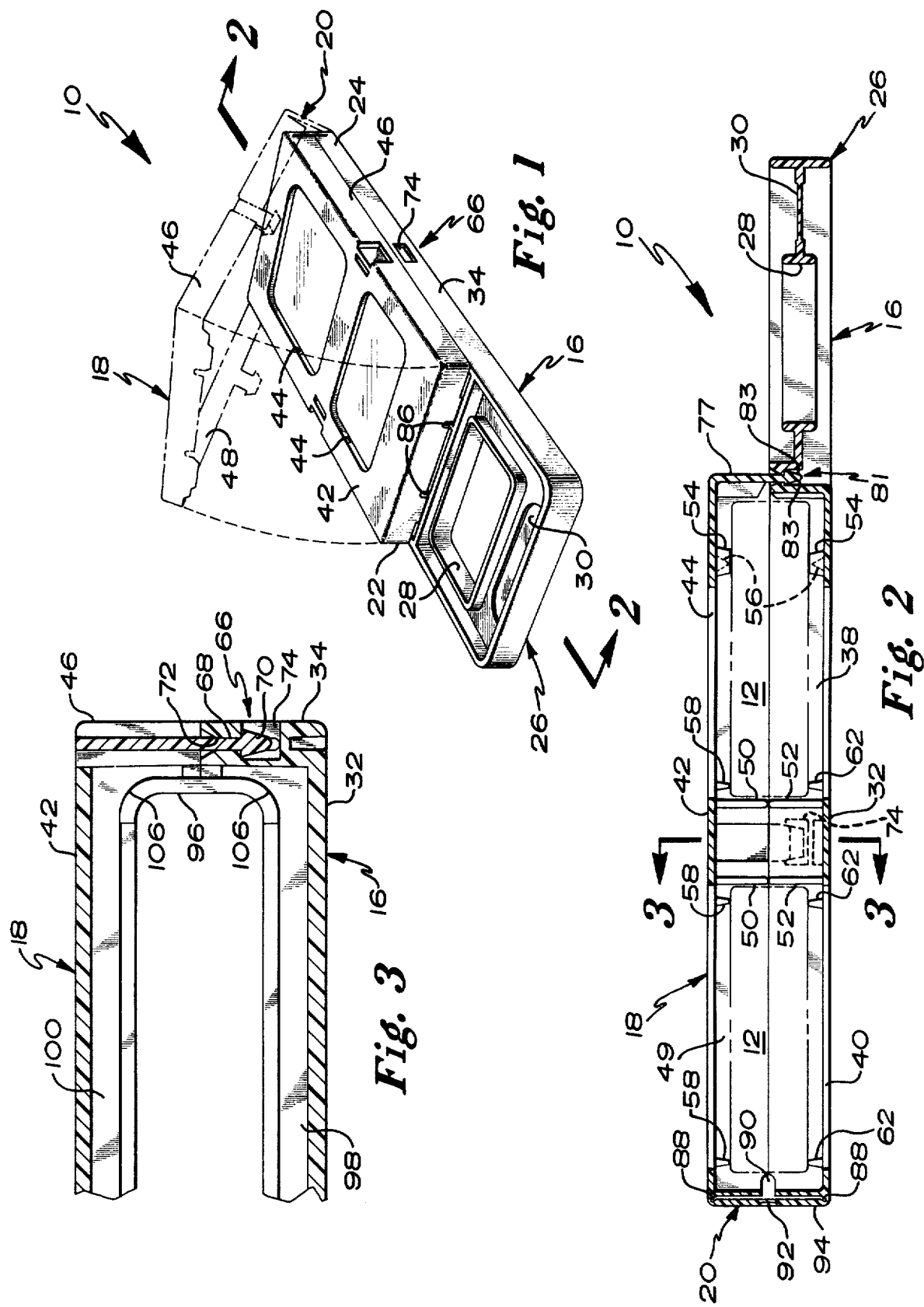

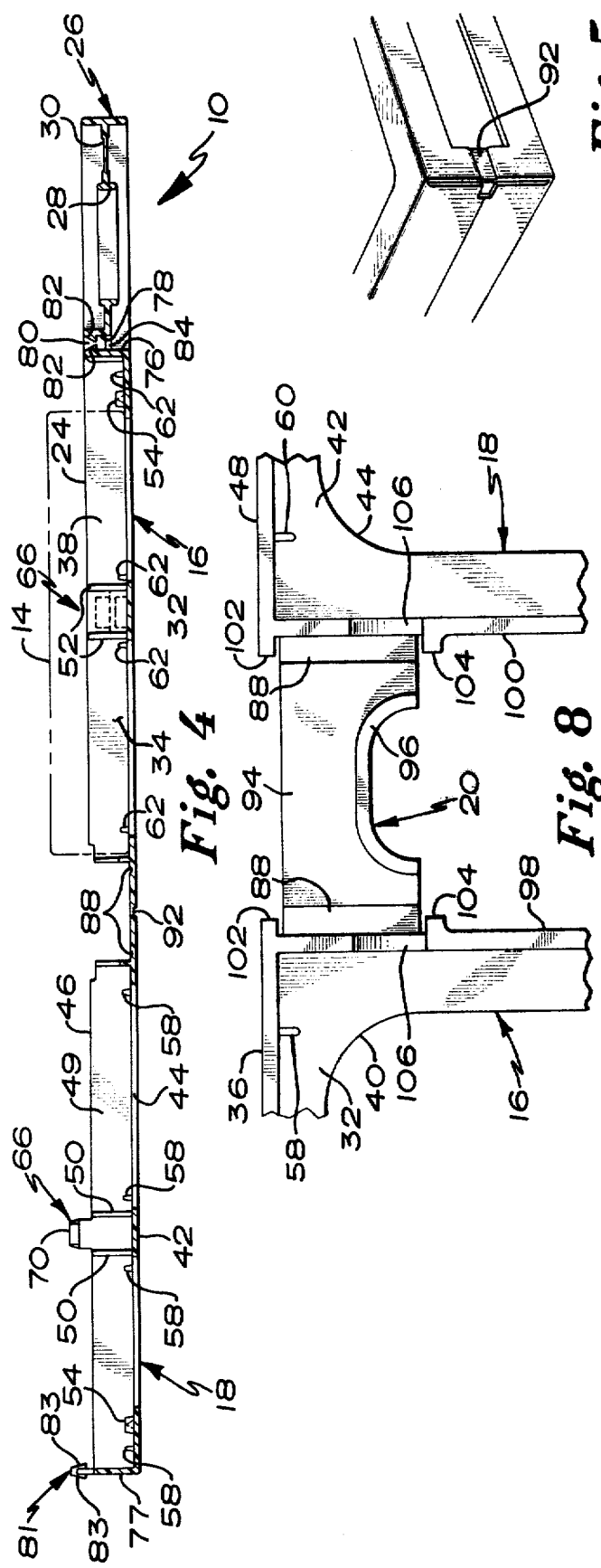
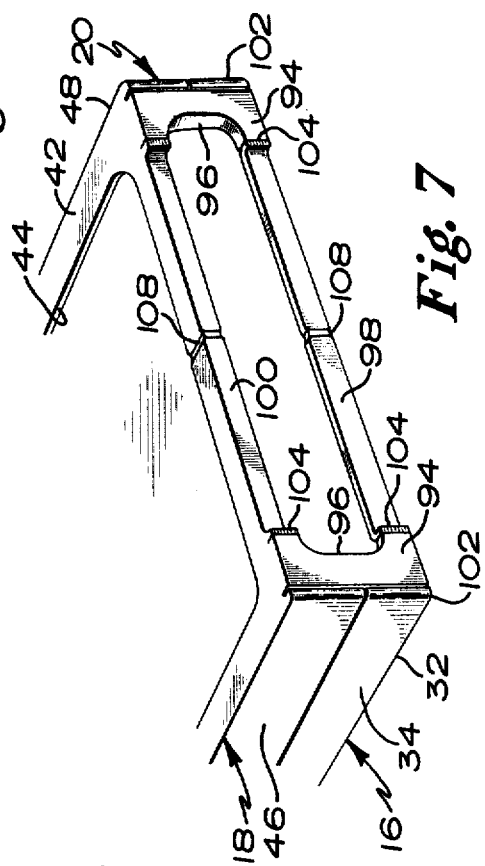
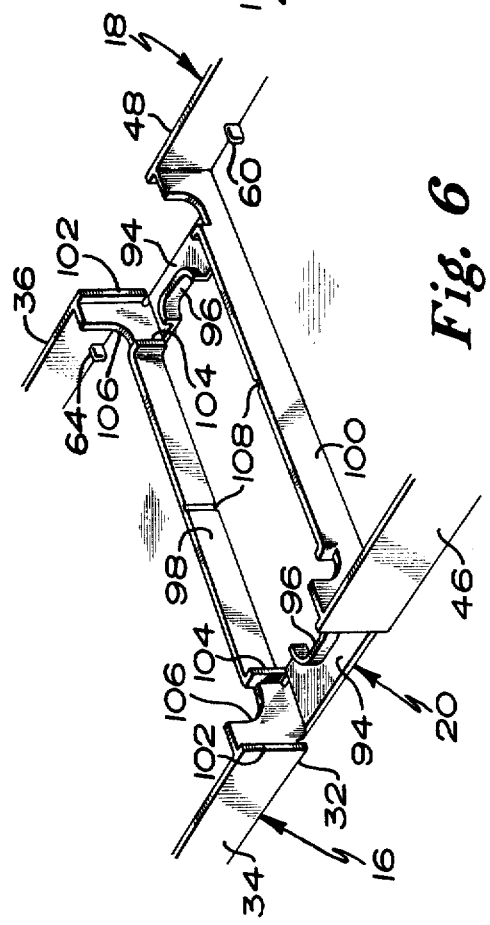

ANTI-THEFT POINT-OF-SALE CONTAINER

BACKGROUND OF THE INVENTION

In recent years, the proliferation of audio tapes, of the eight-track and cassette varieties has posed packaging and display problems for retailers. The size of such items makes them particularly susceptible to shoplifting. It has therefore been known to package such tapes in containers substantially larger than the tape itself so as to discourage concealment on or about the person attempting to shoplift the merchandise. Examples of such efforts are shown in U.S. Pat. Nos. 3,587,837; 3,675,763; 3,776,374; 3,828,922; 3,871,516; and 4,245,741. Such prior art devices have several shortcomings. First, several of such devices are intended to be reuseable, that is, the tape is intended for removal by store personnel. As a consequence, the tape may also be removed by a shoplifter. Those prior art devices constructed of paperboard may also be easily ripped open so as to remove the easily concealed tape. Also, the prior art devices are in general designed for receipt of either a cassette or an eight-track cartridge and are not capable of handling both. One exception to this is U.S. Pat. No. 3,871,516, mentioned above. This patent, however, is designed for carrying only one or the other at a time and is only capable of handling one cassette.

It is, therefore, an object of this invention to provide a device which is capable of carrying one eight-track tape or up to two cassettes and which is designed for permanently being secured so as to require a substantial amount of effort for removal and which is of such a size as to prevent easy concealment on or about the person.

SUMMARY OF THE INVENTION

A plastic tape container is designed for one time use and is designed to carry one eight-track tape or up to two cassettes. A number of ribs are provided so as to allow either alternative to be tightly carried within the same cavity and apertures are provided to permit viewing and yet prevent the contents from being removed from the package. Securing means are provided so as to provide a one-way permanent latch and so that the package may be opened only by cutting after the consumer has returned home.

These and other objects of my invention will become readily apparent as the following description is read in conjunction with the accompanying drawings wherein like reference numerals are used to refer to the several views.

BRIEF DESCRIPTION OF THE DRAWINGS

FIG. 1 is a perspective view showing the instant invention.

FIG. 2 is a sectional view taken along line 2—2 of FIG. 1.

FIG. 3 is a sectional view taken along line 3—3 of FIG. 2.

FIG. 4 is a sectional view taken in the same plane as that of FIG. 2 showing the device in its open state.

FIG. 5 shows the detail of the hinge area.

FIG. 6 is a perspective view showing the hinge area of the alternate embodiment in an open position.

FIG. 7 is a perspective view showing detail of the hinge area of the alternate embodiment in its closed position.

FIG. 8 shows the detail of the hinge area of the alternate embodiment.

DESCRIPTION OF THE PREFERRED EMBODIMENT

The invention, generally 10, is designed for holding cassettes 12 or eight-track tapes 14 therein. Both cassettes 12 and eight-track tapes 14 are understood to include the packaging of the type typically included by the manufacturer; i.e., in the case of cassettes 12 a plastic case of standard dimension and in the case of eight-track tapes a cardboard sleeve or the like.

Container 10 is comprised of a body 16, a cover 18 and a hinge member 20 desirably molded integrally. Body 16 has a first end 22 and a second end 24. A handle 26 is integrally molded to first end 22 of body 16, handle 26 having a handle aperture 28 therein which may be conveniently gripped for carrying. Handle 26 also provides an area 30 upon which indicia may be placed; i.e., of contents, price, or whatever.

Body 16 is comprised of a bottom wall 32 and first and second side walls 34 and 36, respectively. The area contained within body 16 forms body cavity 38. Body bottom wall 32 has viewing apertures 40 formed therein. Viewing apertures 40 are of such size and location as to permit viewing of a substantial portion of the contents of container 10 while preventing removal of the contents when the container 10 is in a closed position.

Cover 18 is comprised of a cover top wall 42 having cover apertures 44 therein. Cover apertures 44 are sized in a manner similar to body viewing apertures 40. Also part of cover 18 are third cover side wall 46 and fourth cover side wall 48. Top wall 42 and side walls 46 and 48 form therein a cover cavity 49. When cover 18 is closed relative to body 16, body cavity 38 and cover cavity 49 are contiguous so as to form a space sized to accept an eight-track or a cassette tape as described more fully hereinafter.

Shown most distinctly in FIGS. 2 and 4 are a number of ribs which serve to locate the contents of the container 10. Cover ribs 50 are located on third and fourth cover side walls 46 and 48 respectively and are spaced from the respective first and second ends so as to snugly accommodate the width of a cassette. Ribs 50 on either side of cover 18 are spaced apart such that an eight-track cartridge may fit between ribs 50 on third side wall 46 and fourth side wall 48. Similarly, body ribs 52 are spaced from body first end 22 and body second end 24 such as to allow two cassettes to be placed in body cavity 38 spaced apart by ribs 52 and yet snugly accommodating cassettes 12. This arrangement is shown most particularly in FIG. 2. The provision of such ribs is important so as to allow the product; i.e., cassettes or eight-track tapes to fit snugly within the container 10 and thereby eliminate manipulation of the contents of the container by a shoplifter.

End ribs 54 are located on the body and body bottom wall 32 and cover top wall 42 respectively. End ribs 54 are spaced from second end 24 by a distance approximately equal to the length of an eight-track cartridge thereby snugly accommodating the cartridge within. When cover 18 is secured to body 16, the spacing between end ribs 54 on body 16 and cover 18 is such that the distance therebetween is approximately the thickness of a cassette.

A number of anti-theft nibs 56 are located on body bottom wall 32 and cover top wall 42 adjacent body first end 22. These nibs are pointed and serve to deter a possible thief from manipulating his fingers into the container 10 in attempting to pull body 16 and cover 18 apart.

First cassette spacing ribs 62 are located at the juncture of first side wall 34 and bottom wall 32. Similarly, second cassette spacing ribs 64 are located at the juncture of second side wall 36 and bottom wall 32. Third cassette spacing ribs 58 are located at the juncture of third side wall 46 and top wall 42 while fourth cassette spacing ribs 60 are located at the juncture of fourth side wall 48 and top wall 42. As can be seen in FIGS. 2 and 4, at least four of each type of ribs are desirable although more or less may be used. Ribs 58 and 62 are spaced from one another by a distance substantially equal to the width of an eight-track cartridge. So also is the spacing between ribs 60 and 64. The spacing between ribs 58 and 62 is substantially equal to the thickness of a cassette as is the distance between ribs 60 and 64.

Side locks 66 are shown in detail in FIG. 3 as well as in FIGS. 1, 2 and 4. Side locks 66 are comprised of tabs 68 located on third and fourth side walls 46 and 48. Side lock tabs 68 have barbs 70 extending from each side thereof. Side lock slots 72 are located on first and second side walls 34 and 36 respectively between ribs 52. Side lock slot 72 has barb slots 74 in the side thereof for retention of barbs 70 therein as is shown most particularly in FIG. 3. Such an arrangement allows an essentially permanent closure as is desired. Side locks 66 may be omitted but the inclusion thereof forms a more secure package.

Body 16 has a first end wall 76 separated from a slot wall 78 by means of webs 84 and 86. Formed between first end wall and slot wall 78 are one or more slots 80 which face upwardly and have located therein ramps 82 as shown in FIGS. 2 and 4. A cover first end wall 77 is made to overlie body end wall 76 when container 10 is closed and end wall 77 has depending therefrom two tabs 81 similar in shape to tabs 68 of side locks 66. Tabs 81 have extending from either side thereof barbs 83 which upon closure wedgingly press past ramps 82 and engage the bottom side thereof as shown in the drawings to provide an essentially permanent closure. The provision of webs 84 and 86 as shown in the drawing assure a sufficient amount of strength such that the closures are quite difficult to open.

The preferred embodiment of the instant invention is formed of a polypropylene plastic. This plastic is not subject to the brittleness of the materials used in several of the prior art devices which may be easily snapped or shattered upon application of force.

In a first embodiment of the instant invention, hinge members 20 are shown in FIGS. 1 and 8 and are attached to the cover 18 and body 16 by means of hinge lines 88. A weakened line 92 is provided on hinge members 20 so as to allow the customer to cut the package open with a pair of scissors or the like upon returning home. Slots 90 are provided adjacent either end of the hinge members to allow the entrance of scissors therein.

The alternative version of the end hinge is shown in FIGS. 5 through 7 wherein hinge members 94 are joined to cover 18 and body 16 at hinge lines 88. Hinge members 94 are provided with an arc shaped cutout having a rib 96 extending therearound. Second end walls 98 and 100 are attached to body 16 and cover 18 respectively. These end walls have located thereon and extending substantially vertically ribs 102 and 104 between which fit hinge members 94. A hook-shaped cutout 106 is located between ribs 102 and 104 and is sized and located so as to accommodate rib 96 therein as shown most particularly in FIGS. 6 and 7. In this embodiment, a weakened line 108 is provided in top wall 42, end walls 98 and 100 and bottom wall 32 to allow the customer to cut the container open as mentioned heretofore.

While the preferred embodiments of the present invention have been described, it should be understood that various changes, adaptations and modifications may be made therein without departing from the spirit of the invention and the scope of the appended claims.

What is claimed is:

1. An anti-theft point-of-sale container for tapes, the container comprising:
    a body, said body having a cavity therein of a width at least as great as the length of a cassette, said cavity having a length at least twice the thickness of a cassette, said body comprising first and second ends and first and second side walls;
    a handle attached to said body first end;
    at least one hinge member, hingedly attached to said body second end;
    a cover comprising first and second ends hingedly attached at said cover second end to said hinge member and third and fourth side walls, said cover having a cavity therein complementary to said body cavity and having a length and width substantially equal thereto; and
    means for permanently securing said cover to said body,
    said securing means comprising:
    at least one tab means extending from said second end of one of said body and said cover, each said tab means having barb means on at least one side thereof;
    first and second slot walls extending between said side walls of the other of said body and said cover, said slot walls being connected by at least one web means intermediate said side walls, said slot walls being of a depth and thickness so as to prevent substantial distortion due to manual manipulation from the exterior of said container.

2. The anti-theft point-of-sale container of claim 1 wherein said body further comprises a bottom wall and said cover comprises a top wall.

3. The anti-theft point-of-sale container of claim 2 wherein said bottom wall comprises at least one viewing aperture of a size small enough to prevent the manipulation of a cassette therethrough.

4. The anti-theft point-of-sale container of claim 3 wherein said top wall comprises at least one viewing aperture of a size small enough to prevent the manipulation of a cassette therethrough.

5. The anti-theft point-of-sale container of claim 4 further comprising viewing aperture means at said second end.

6. The anti-theft point-of-sale container of claim 2 further comprising:
    at least one first spacing rib attached to said bottom wall and said first side wall; and
    at least one second spacing rib attached to said bottom wall and said second side wall, each said first spacing rib being separate from each said second spacing rib by a distance at least as great as the width of an eight-track cartridge.

7. The anti-theft point-of-sale container of claim 6 further comprising:
   at least one third spacing rib attached to said top wall and said third side wall; and
   at least one fourth spacing rib attached to said fourth side wall and said top wall, each said third spacing rib being separate from each said fourth spacing rib by a distance at least as great as the width of an eight-track cartridge.

8. The anti-theft point-of-sale container of claim 7 wherein when said cover is secured to said body with said cavities contiguous, each said first spacing rib and each said third spacing rib are separated by a distance substantially equal to the thickness of a cassette.

9. The anti-theft point-of-sale container of claim 8 wherein when said cover is secured to said body with said cavities contiguous, each said second spacing rib and each said fourth spacing rib are separated by a distance substantially equal to the thickness of a cassette.

10. The anti-theft point-of-sale container of claim 9 wherein the combined height of said body and cover side walls is substantially equal to the thickness of an eight-track cartridge.

11. The anti-theft point-of-sale container of claim 10 further comprising at least one bottom end rib extending from said bottom wall and being spaced from one of said ends a distance substantially equal to the length of an eight-track cartridge.

12. The anti-theft point-of-sale container of claim 11 further comprising at least one bottom end rib extending from said top wall and being spaced from one of said ends a distance substantially equal to the length of an eight-track cartridge.

13. The anti-theft point-of-sale container of claim 2 wherein said securing means is located adjacent said first end.

14. The anti-theft point-of-sale container of claim 13 further comprising a plurality of pointed anti-theft ribs extending into said body cavity from said bottom wall adjacent said first end.

15. The anti-theft point-of-sale container of claim 14 further comprising a plurality of pointed anti-theft ribs extending into said cover cavity from said top wall adjacent said first end.

16. The anti-theft point-of-sale container of claim 13 further comprising securing means located on said side walls approximately equidistant from said first and second ends.

17. The anti-theft point-of-sale container of claims 13 or 16 wherein said securing means comprises:
   at least one tab extending from said second end of one of said body and said cover, said tab having barb means on either side thereof; and
   at least one slot in said first end of the other of said body and said cover, said slot having barb means in either side thereof located and spaced so as to permanently retain each said tab in each said slot.

18. The anti-theft point-of-sale container of claim 17 wherein said slot sides are of a depth and thickness so as to prevent substantial distortion thereof from the exterior of said container.

19. The anti-theft point-of-sale container of claim 2 wherein said body further comprises an end wall located at said body second end and said cover further comprises an end wall located at said cover second end.

20. The anti-theft point-of-sale container of claim 19 wherein each said hinge member comprises means for interlocking with said end walls.

21. The anti-theft point-of-sale container of claim 20 wherein said interlocking means comprises at least one recess in each said end wall for receiving each said hinge member.

22. The anti-theft point-of-sale container of claim 21 further comprising aperture means in said end walls for viewing the contents of said container.

23. The anti-theft point-of-sale container of claim 2 further comprising a weakened arc adjacent said second end to allow said container to be cut open.

24. The anti-theft point-of-sale of claim 23 wherein said weakened area is located on each said hinge member.

25. The anti-theft point-of-sale container of claim 23 wherein said weakened area is located on said end walls.

26. An anti-theft point-of-sale container for concealable products, the container comprising:
   a body, said body having a cavity comprising means for accommodating therein at least one first product or at least one second product, said first and second products being differently sized, said accommodating means snugly retaining at least one of said products and said body comprising first and second ends and first and second side walls;
   a handle attached to said body first end;
   at least one hinge member, hingedly attached to said body second end;
   a cover comprising first and second ends hingedly attached at said cover second end to said hinge member and third and fourth side walls, said cover having a cavity therein complementary to said body cavity and having a length and width substantially equal thereof; and
   means for permanently securing said cover to said body, said securing means comprising:
      at least one tab means extending from said second end of one of said body and said cover, each said tab means having barb means on at least one side thereof;
      first and second slot walls extending between said side walls of the other of said body and said cover, said slot walls being connected by at least one web means intermediate said side walls, said slot walls being of a depth and thickness so as to prevent substantial distortion due to manual manipulation from the exterior of said container.

27. The anti-theft point-of-sale container of claim 26 wherein said body further comprises a bottom wall and said cover comprises a top wall.

28. The anti-theft point-of-sale container of claim 27 wherein said bottom wall comprises at least one viewing aperture of a size small enough to prevent the manipulation of a product therethrough.

29. The anti-theft point-of-sale container of claim 28 wherein said top wall comprises at least one viewing aperture of a size small enough to prevent the manipulation of a product therethrough.

30. The anti-theft point-of-sale container of claim 29 further comprising viewing aperture means at said second end.

31. The anti-theft point-of-sale container of claim 27 further comprising:
   at least one first spacing rib attached to said bottom wall and said first side wall; and at least one second spacing rib attached to said bottom wall and said second side wall, each said first spacing rib being separate from each second spacing rib by a distance at least as great as the width of a first product.

32. The anti-theft point-of-sale container of claim 31 further comprising:
   at least one third spacing rib attached to said top wall and said third side wall; and
   at least one fourth spacing rib attached to said fourth side wall and said top wall, each said third spacing rib being separate from each said fourth spacing rib by a distance at least as great as the width of a first product.

33. The anti-theft point-of-sale container of claim 32 wherein when said cover is secured to said body with said cavities contiguous, each said first spacing rib and each said third spacing rib are separated by a distance substantially equal to the thickness of a second product.

34. The anti-theft point-of-sale container of claim 33 wherein when said cover is secured to said body with said cavities contiguous, each said second spacing rib and each said fourth spacing rib are separated by a distance substantially equal to the thickness of a second product.

35. The anti-theft point-of-sale container of claim 34 wherein the combined height of said body and cover side walls is substantially equal to the thickness of a first product.

36. The anti-theft point-of-sale container of claim 35 further comprising at least one bottom end rib extending from said bottom wall and being spaced from one of said ends a distance substantially equal to the length of a first product.

37. The anti-theft point-of-sale container of claim 36 further comprising at least one bottom end rib extending from said top wall and being spaced from one of said ends a distance substantially equal to the length of a first product.

38. The anti-theft point-of-sale container of claim 27 wherein said securing means is located adjacent said first end.

39. The anti-theft point-of-sale container of claim 38 further comprising a plurality of pointed anti-theft ribs extending into said body cavity from said bottom wall adjacent said first end.

40. The anti-theft point-of-sale container of claim 39 further comprising a plurality of pointed anti-theft ribs extending into said cover cavity from said top wall adjacent said first end.

41. The anti-theft point-of-sale container of claim 38 further comprising securing means located on said side walls approximately equidistant from said first and second ends.

42. The anti-theft point-of-sale container of claim 27 wherein said body further comprises an end wall located at said body second end and said cover further comprises an end wall located at said cover second end.

43. The anti-theft point-of-sale container of claim 42 wherein each said hinge member comprises means for interlocking with said end walls.

44. The anti-theft point-of-sale container of claim 43 wherein said interlocking means comprises at least one recess in each said end wall for receiving each said hinge member.

45. The anti-theft point-of-sale container of claim 44 further comprising aperture means in said end walls for viewing the contents of said container.

46. The anti-theft point-of-sale container of claim 27 further comprising a weakened arc adjacent said second end to allow said container to be cut open.

47. The anti-theft point-of-sale container of claim 46 wherein said weakened area is located on each said hinge member.

48. The anti-theft point-of-sale container of claim 46 wherein said weakened area is located on said end walls.

49. An anti-theft point-of-sale container for concealable products, the container comprising:
   a body, said body having a cavity comprising means for accommodating therein at least one first product or at least one second product, said first and second products being differently sized, said accommodating means snugly retaining at least one of said products and said body having first and second ends, a bottom wall and first and second side walls;
   a handle attached to said body first end;
   at least one hinge member, hingedly attached to said body second end;
   a cover having first and second ends hingedly attached at said cover second end to said hinge member, said cover having a cavity therein complementary to said body cavity and having a length and width substantially equal thereto and having a top wall and third and fourth side walls;
   at least one first spacing rib attached to said bottom wall and said first side wall;
   at least one second spacing rib attached to said bottom wall and said second side wall, each said first spacing rib being separate from each second spacing rib by a distance at least as great as the width of a first product;
   at least one third spacing rib attached to said top wall and said third side wall;
   at least one fourth spacing rib attached to said fourth side wall and said top wall, each said third spacing rib being separate from each said fourth spacing rib by a distance at least as great as the width of a first product; wherein when said cover is secured to said body with said cavities contiguous, each said first spacing rib and each said third spacing rib are separated by a distance substantially equal to the thickness of a second product; and wherein when said cover is secured to said body with said cavities contiguous, each said second spacing rib and each said fourth spacing rib are separated by a distance substantially equal to the thickness of a second product; and wherein the combined height of said body and cover side walls is substantially equal to the thickness of a first product;
   at least one bottom end rib extending from said bottom wall and being spaced from one of said ends a distance substantially equal to the length of a first product; and
   at least one bottom end rib extending from said top wall and being spaced from one of said ends a distance substantially equal to the length of a first product.

* * * * *